Feb. 26, 1952 W. R. AIKEN 2,587,426

PULSE FORMING NETWORK

Filed April 28, 1950 2 SHEETS—SHEET 1

INVENTOR.
WM. ROSS AIKEN

BY Roland A. Anderson

ATTORNEY.

Feb. 26, 1952 W. R. AIKEN 2,587,426

PULSE FORMING NETWORK

Filed April 28, 1950 2 SHEETS—SHEET 2

INVENTOR.
WM. ROSS AIKEN

BY Roland A. Anderson

ATTORNEY.

Patented Feb. 26, 1952 2,587,426

UNITED STATES PATENT OFFICE 2,587,426

PULSE FORMING NETWORK

William R. Aiken, Berkeley, Calif., assignor to the United States of America as represented by the United States Atomic Energy Commission Application April 28, 1950, Serial No. 158,847

5 Claims. (Cl. 250—27)

This invention relates to a pulse forming control network and more particularly to an electronic circuit responsive to a predetermined frequency of a frequency modulated signal voltage for forming a pulse of voltage at the predetermined frequency according to the direction of frequency shift.

The increasing use of frequency modulated electrical systems requires auxiliary circuits for control purposes. Certain applications of such systems require the development of a control pulse of voltage at a predetermined frequency when the frequency shift is in a particular direction. An example of the above-referenced systems is a frequency modulated cyclotron wherein the accelerating potential applied is frequency modulated. With such a cyclotron the timing of the operation may be readily based upon the frequency of the frequency modulated accelerating voltage during each frequency excursion and is simplified thereby. With an appropriate control circuit it is possible to properly time the initiation of the particle injection and of the deflector voltage. The present invention provides an electronic control circuit for forming a pulse of voltage having the required characteristics in a simple manner utilizing standard electronic parts well within their ratings.

It is therefore an object of the present invention to provide a new and improved pulse forming control network.

Another object of the present invention is to provide a pulse forming control network, the output of which occurs at a predetermined frequency when the frequency shift of a frequency modulated signal voltage is in a particular direction.

Still another object of the present invention is to provide a pulse forming control network that will develop an output signal which is dependent only on frequency and on the direction of frequency shift of a frequency modulated input voltage and which is independent of amplitude modulation and extraneous interference.

A further object of the present invention is to provide a pulse forming control network which is not critical in the formation of an output signal at the gate circuit therein.

Other objects and advantages will be apparent in the following description and claims considered together with the accompanying drawing, in which:

Figure 1:
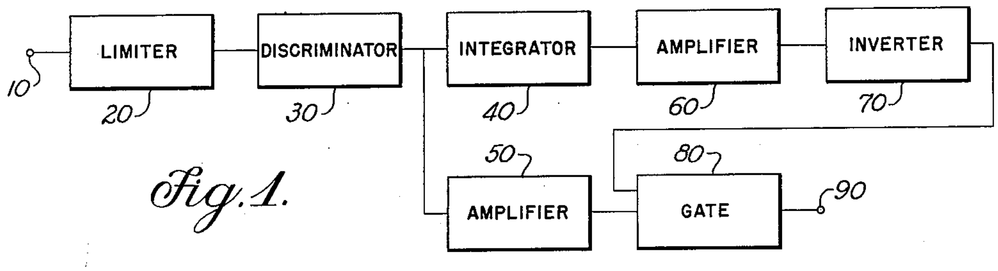
Figure 1 is a block diagram illustrating the present invention.
Figure 2:
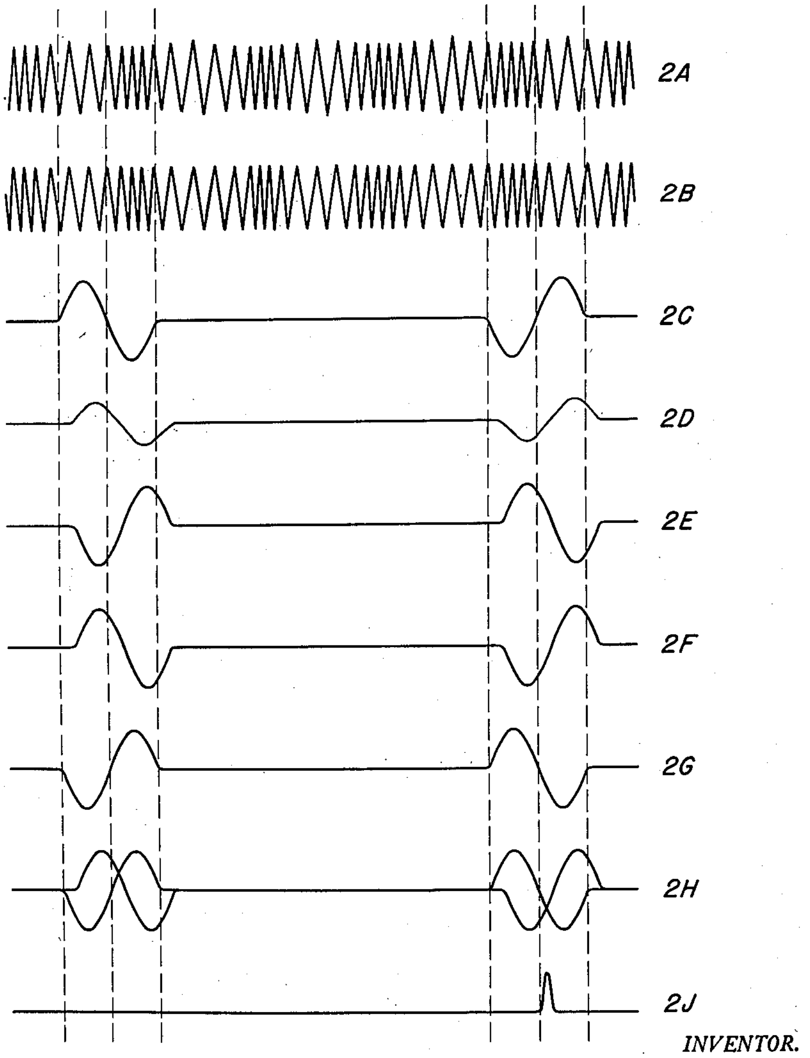
Fig. 2 is a series of time correlated voltage waveforms which occur at various elements during operation of the present invention.

Referring to the drawing in detail, and to Figs. 1 and 2 in particular, an input terminal 10 connects a frequency modulated voltage, as shown in Fig. 2A, to a limiter 20. The limiter 20 removes any variations in the envelope of the frequency modulated voltage and has an output voltage, as shown in Fig. 2B, which is connected to the input of a discriminator 30. The output voltage of the discriminator 20 varies substantially sinusoidally about a predetermined frequency, as shown in Fig. 2C, and is connected to the input of an integrator 40 and an amplifier 50. A voltage, as shown in Fig. 2D, having the same general waveform as the input, but shifted somewhat in phase, appears at the output of the integrator 40 and is then impressed upon an amplifier 60. Since the output voltage, as shown in Fig. 2E, of the amplifier is inverted with respect to the input thereto, an inverter 70 is connected to such output to reestablish the original phase relationship, as shown in Fig. 2F. The latter voltage is then impressed on one input of a gate 80. A second input of the gate 80 is connected to the output of the amplifier 50 and obtains a voltage therefrom having a waveform as shown in Fig. 2G. For convenience the waveforms at the inputs of the gate 80 have been included on a single line, as shown in Fig. 2H. The output of the gate 80 is a pulse of voltage, as shown in Fig. 2J, occurring at the time both input voltages are negative, and appears at an output terminal 90.

Figure 3:
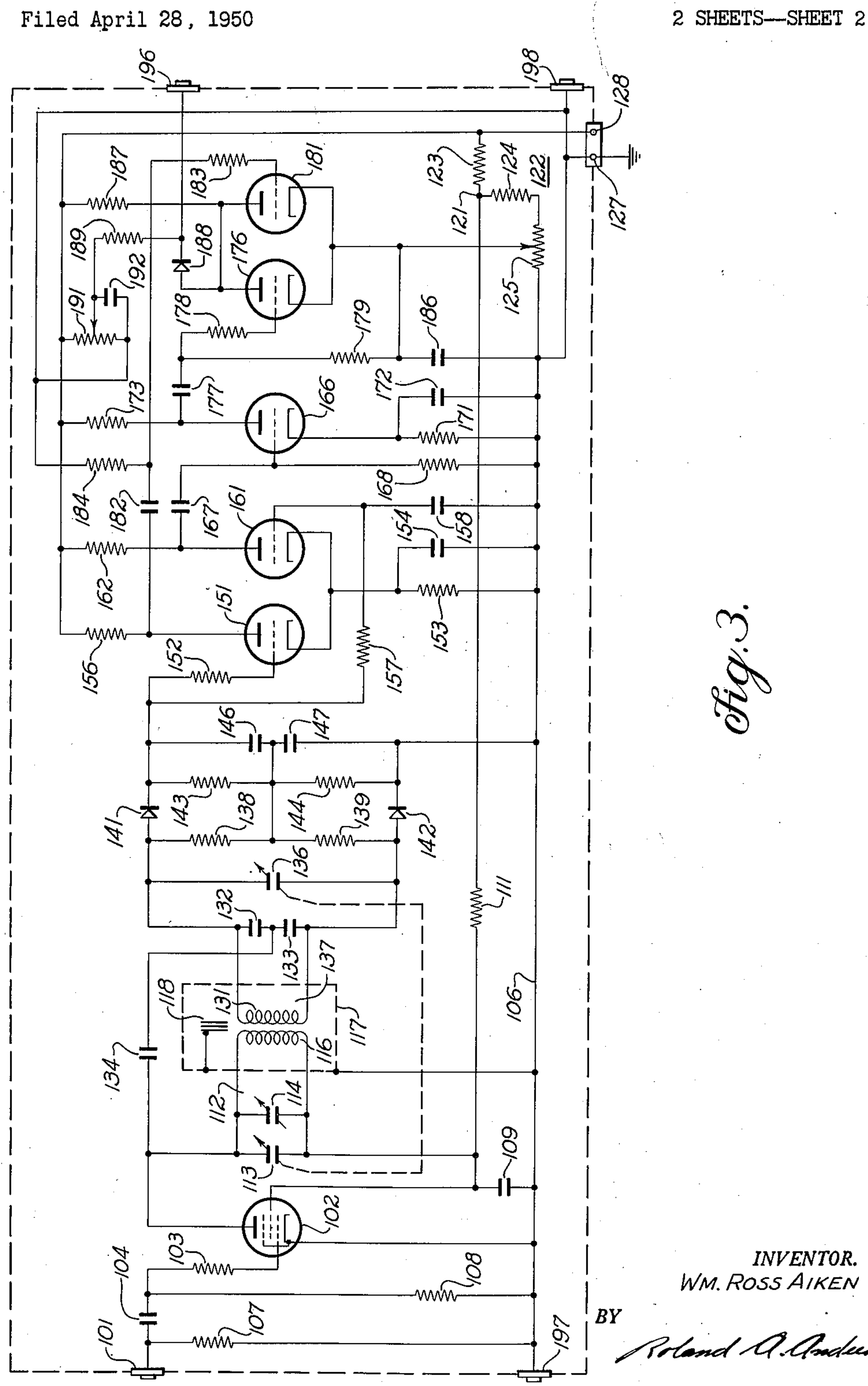
Fig. 3 is a schematic wiring diagram of the present invention.

Referring now to Fig. 3, an input terminal 101 carries a frequency modulated signal voltage, as shown in Fig. 2A, impressed from a source (not shown), such as the accelerating voltage supply of a frequency modulated cyclotron. A pentode tube 102, which serves as a limiter tube to remove any amplitude modulation from the signal voltage, is connected with the control grid to the terminal 101 through a series connected current limiting resistor 103 and a coupling condenser 104. The junction between the terminal 101 and the condenser 104 is connected to a ground connection 106 through a resistor 107. The junction between the condenser 104 and the resistor 103 is connected to the ground connection 106 through a biasing resistor 108. To complete the connections for the tube 102, the cathode is directly connected to the ground connection 106, the screen grid is connected to the ground connection through a by-pass condenser 109 and to one end of a resistor 111, the suppressor grid is directly connected to the cathode, and the anode is connected to a resonant tank circuit 112 comprising two parallel connected variable condensers 113 and 114 and the primary winding 116 of a coupling transformer 117. The transformer 117 is provided with an adjustment 118 for changing the permeability of the core and thereby the values of the inductance of the windings. One side of the tank circuit 112 is connected to the junction between the screen grid of the tube 102 and the resistor 111 so that the primary winding of the transformer 117 provides a direct current path to the anode of the tube. To supply the necessary anode voltage to the tube 102 the other end of the resistor 111 is connected to junction 121 of a voltage divider 122 comprising a series connected resistor 123, resistor 124, and potentiometer 125. The voltage divider 122 is in turn connected to a pair of terminals 127 and 128, one of which is common to the ground connection 106 and the other of which carries a positive unidirectional voltage from an external source (not shown). The secondary winding 131 of the transformer 117 is connected in parallel with two series connected condensers 132 and 133, the junction between which is coupled to the anode of the tube 102 through a condenser 134. Connected in parallel with the condensers 132 and 133 is a variable condenser 136, the latter being gang controlled along with the condenser 113. Thus it will be readily apparent that the secondary winding 131 and the condenser 136 form a second resonant tank circuit 137 which is adjustable along with the tank circuit 112. A voltage divider comprising two series resistors 138 and 139 is also connected in parallel with the condensers 132 and 133. The junction between the resistor 138 and the condenser 136 is connected to the positive terminal of a rectifier 141, preferably of the crystal type. The junction between the resistor 139 and the condenser 136 is connected to the positive terminal of another rectifier 142, also preferably of the crystal type. Another voltage divider comprising two series connected resistors 143 and 144 is connected between the negative terminals of the rectifiers 141 and 142. Two series connected condensers 146 and 147 are also connected to the negative terminals of the rectifiers 141 and 142. To complete the connections of the discriminator circuit being described the junction between condensers 146 and 147 is connected to the junction between the resistors 143 and 144, and to the junction between the resistors 138 and 139. Further, the negative terminal of the rectifier 142 is connected to the ground connection 106 so that the entire output voltage of the discriminator circuit is above the ground potential. The values of the elements comprising the discriminator circuit, just described, are preferably chosen to a narrow frequency band response to permit rapid voltage versus frequency variations, but still broad enough to pass the desired pulse.

The output of the discriminator circuit is taken from the negative terminal of the rectifier 141 and across the resistors 143 and 144 and is applied to the control grid of a triode amplifying tube 151 through a current limiting resistor 152. To complete the connections of the tube 151 the cathode is connected to the ground connection 106 through a parallel connected resistor 153 and by-pass condenser 154 and the anode is connected to the positive terminal 128 through a dropping resistor 156. The output of the discriminator circuit is also connected to an integrating circuit comprising a series resistor 157 and condenser 158, one side of the latter being connected to the ground connection 106. The values of the resistor 157 and condenser 158 are chosen to cause a phase shift in a lagging direction between the input voltage and the voltage across the condenser 158. To amplify the shifted output voltage the junction between the resistor 157 and condenser 158 is connected to the control grid of a triode amplifying tube 161. Other connections of the tube 161 are from the cathode to the cathode of the tube 151 and from the anode to the terminal 128 through a dropping resistor 162. The anode of the tube 161 is also connected to the control grid of a tube 166 through a coupling condenser 167, the latter tube 166 serving as an inverter for the amplified voltage appearing at the anode of the former tube 161. To complete the connections for the tube 166 the control grid is connected to the ground connection 106 through a biasing resistor 168, the cathode is connected to the ground connection 106 through a parallel connected resistor 171 and condenser 172, and the anode is connected to the terminal 128 through a dropping resistor 173.

The inverted signal appearing at the anode of the tube 166 is coupled to the control grid of a triode tube 176 through a series connected coupling condenser 177 and current limiting resistor 178. The junction between the condenser 177 and the resistor 178 is connected to the cathode of the tube 176 through a biasing resistor 179. The amplified signal appearing at the anode of the tube 151 is coupled to the control grid of another triode tube 181 through a series connected coupling condenser 182 and current limiting resistor 183. The junction between the condenser 182 and resistor 183 is connected to the ground connection 106 through a biasing resistor 184. The tubes 176 and 181 are interconnected in the form of a gate circuit preferably to develop an output voltage only when the control grids of both tubes become negative. To accomplish such a result the anode of the tube 176 is connected to the anode of the tube 181 and the cathodes are similarly connected together. The cathodes of the tubes 176 and 181 are further connected to the ground connection 106 through a by-pass condenser 186 and to the adjustable element of the potentiometer 125. The anodes of the tubes 176 and 181 are connected to the positive terminal 128 through a dropping resistor 187. To limit the output voltage at the anodes of the tubes 176 and 181 a connection from the anodes is made to the positive terminal of a rectifier 188, preferably of the crystal type, the negative terminal of which is connected through a resistor 189 to the adjustable element of a potentiometer 191. The potentiometer is connected between the positive terminal 128 and the ground connection 106 and the portion of the voltage appearing between the adjustable element and the ground connection 106 is bypassed by a condenser 192 connected therebetween. The junction between the rectifier 188 and the resistor 189 is connected to an output terminal 196 which serves as a convenient means for connecting to an external circuit. Other external connections are provided by connecting the ground connection 106 to an input terminal 197 and an output terminal 198.

Consider now the operation of the foregoing described circuit with the terminals 127 and 128 suitably connected to an energized source of unidirectional voltage and with the input terminals 101 and 197 connected across a source of frequency modulated signal voltage having a waveform, as shown in Fig. 2A. As stated previously the tube 102 is connected in the form of a limiter and serves to remove any amplitude modulation which might be present in the incoming signal voltage. The condenser 113 provides a coarse adjustment of the resonant frequency of the tank circuit 112, while the condenser 114 provides a fine adjustment. Also provided to adjust such resonant frequency is the permeability adjustment 118 of the coupling transformer 117. With the values of the tank circuit set for a certain predetermined resonant frequency within the range of frequency of the frequency modulated signal voltage, the impedance of the tank circuit 112 varies from a maximum value to a minimum value as the frequency approaches such resonant frequency and increases to a maximum value again as the frequency continues to increase. It will be readily apparent that each time the frequency modulated signal voltage makes an excursion from a minimum value to a maximum value and back again to the minimum value, the resonant frequency of the tank circuit 112 will be passed twice, once during the ascending swing of the frequency, and once during the descending swing of the frequency. The values of inductance of the secondary winding 131 and the capacitance of the condenser 136 are adjusted to substantially the same resonant frequency as the tank circuit 112, thereby developing across the condenser voltage divider a voltage proportional to that occurring in the tank circuit 112. The action of the condenser 134, the rectifiers 141 and 142, the resistors 143 and 144 as interconnected, is the same as occurs in any conventional discriminator circuit to produce a substantially symmetrical sine wave each time the frequency of the input voltage passes through the resonant frequency of the tank circuits 112 and 137. On the rising frequency the voltage at the junction between the resistor 143 and rectifier 141 increases positively from zero to a maximum, decreases to zero at a time correlating to the time of the resonant frequency, then decreases to a maximum negatively, and finally back to zero. Similarly, during decreasing frequency a voltage is developed which increases negatively from zero to a maximum, increases positively to zero at the resonant frequency, then continues to increase to a positive maximum and finally returns to zero. These latter two voltage waveforms are illustrated in Fig. 2C, and are impressed at the control grid of the amplifier tube 151 and at the input to the integrator comprising the resistor 157 and condenser 158. The values of the resistor 157 and condenser 158 are chosen to shift the phase of the output voltage, as taken across the condenser 158, with respect to the input voltage thereto, and as will be pointed out hereinafter such values are not critical nor is the degree of phase shift. The voltage across the condenser 158, as shown in Fig. 2D, is then impressed upon the control grid of the amplifier tube 161. For the purpose of the presently described embodiment of the invention, it is necessary to invert the voltage, as shown in Fig. 2E, appearing at the anode of the tube 161, therefore such voltage is coupled to the control grid of a second amplifier tube 166. The voltage at the anode of the tube 166, as shown in Fig. 2F, is connected to the control grid of one tube 176 of a pair of tubes 176 and 181 which are interconnected in the form of a gate to develop an output voltage only at the time both tubes are nonconducting. The voltage at the anode of the tube 151, as shown in Fig. 2G, is connected to the control grid of the tube 181. With the tube 176 normally biased so that the tube is conducting and the tube 181 normally biased so that the tube is nonconducting, the impression of a positive bias at the control grid of the tube 176 will have no effect on the operation of the gate. Similarly a positive voltage applied to the grid of the tube 181 will render that tube conducting, but no output voltage will be developed. It is also to be noted that no output voltage is developed when voltages applied to the grids of the tubes 176 and 181 render the normally conducting tube nonconducting and the normally nonconducting tube conducting. As stated previously, it is desirable to obtain an output voltage when both tubes are rendered nonconducting, and as will be seen in Fig. 2H such condition exists only during the descending frequency of the frequency modulated signal voltage at a time corresponding to the occurrence of the resonant frequency of the tank circuits 112 and 137. Such output voltage then is shown in Fig. 2J along with its time correlation to the other waveforms shown in Fig. 2.

From the foregoing it is readily apparent that the objects of the present invention have been accomplished in the proposed manner. From a frequency modulated input voltage an output voltage pulse has been developed which is initiative at a predetermined frequency and, as desired, during the time the frequency is decreasing.

It is to be noted that by minor modifications in the circuit that the output voltage may be developed during the time the frequency is increasing. Such modifications merely involve coupling the anode of the tube 161 to the control grid of the tube 176, coupling the anode of the tube 151 to the control grid of the tube 166, and coupling the anode of the tube 166 to the control grid of the tube 181. These changes are sufficient to make the control grids of the tubes 176 and 181 negative at the time of the desired frequency while the frequency is increasing.

It is also to be noted that a differentiator circuit may be substituted for the integrator described above. However, such a change results in a more critical circuit in that the degree of phase shift has to be exactly ninety degrees for proper operation and allows the generation of a spurious output voltage pulse by the occurrence of a positive "noise" pulse within the circuit.

While the present invention has been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a pulse forming control circuit for a frequency modulated system, the combination comprising a discriminator having a pair of tank circuits tuned to a predetermined frequency for developing a substantially sinusoidal voltage each time said predetermined frequency occurs, means amplifying said sinusoidal voltage to form a first signal voltage, integrating means shifting the phase of said sinusoidal voltage to form a second signal voltage lagging said first signal voltage in time, means amplifying said second signal voltage, means inverting said amplified second signal voltage, and gate means responsive only to the occurrence of a negative amplified first signal voltage and a simultaneously negative inverted second signal voltage to initiate a positive output voltage at said predetermined frequency.

2. In a pulse forming control circuit for a frequency modulated system, the combination comprising an input connected to said system for receiving a frequency modulated voltage therefrom, limiting means connected to said input for removing amplitude modulation from said frequency modulated voltage, discriminating means connected to said limiting means for developing a substantially sinusoidal voltage each time said frequency modulated voltage passes through a predetermined frequency, amplifying means connected to said discriminating means for forming a first signal voltage, integrating means connected to said discriminating means for shifting the phase of said sinusoidal voltage to form a second signal voltage lagging said first signal voltage in time, amplifying means connected to said integrating means, inverting means connected to said amplifying means for changing the phase of said amplified second signal voltage by 180 degrees, and gate means having two inputs and an output for initiating a positive voltage at said output when both inputs are impressed negatively, one of said inputs being connected to said first signal voltage amplifying means and the other of said inputs being connected to said second signal voltage inverting means.

3. In a pulse forming control circuit for a frequency modulated system, the combination comprising an input connected to said system for receiving a frequency modulated voltage therefrom, limiting means connected to said input for removing amplitude modulation from said frequency modulated voltage, discriminating means connected to said limiting means for developing a substantially sinusoidal voltage each time said frequency modulated voltage passes through a predetermined frequency, amplifying means connected to said discriminating means for forming a first signal voltage, a series connected resistor and condenser connected to said discriminating means, the values of said resistor and condenser being predetermined so that the voltage across said condenser lags said sinusoidal voltage to form a second signal voltage, amplifying means connected to the junction between said resistor and condenser for amplifying said lagging second signal voltage, inverting means connected to said amplifying means for changing the phase of said amplified second signal voltage by 180 degrees, and gate means having two inputs and an output for initiating a positive voltage at said output when both inputs are impressed negatively, one of said inputs being connected to said first signal amplifying means and the other input being connected to said second signal voltage inverting means.

4. In a pulse forming circuit for a frequency modulated system, the combination comprising an input connected to said system for receiving a frequency modulated voltage therefrom, limiting means connected to said input for removing amplitude modulation from said frequency modulated voltage, discriminating means connected to said limiting means for developing substantially sinusoidal voltage each time said frequency modulated voltage passes through a predetermined frequency, amplifying means connected to said discriminating means for forming a first signal voltage, integrating means connected to said discriminating means for shifting the phase of said sinusoidal voltage to form a second signal voltage lagging said first signal voltage in time, amplifying means connected to said integrating means, inverting means connected to said amplifying means for changing the phase of said amplified second signal voltage by 180 degrees, and a first and second triode vacuum tube, means for applying operating voltages between the anode and cathode of each of said tube said tubes having the anodes and cathodes interconnected, means for biasing the control grid of said first tube positively, means for biasing the control grid of said second tube negatively, means for coupling said inverted second signal voltage to the control grid of said first tube, and means for coupling said amplified first signal voltage to the control grid of said second tube.

5. A pulse forming control circuit of claim 1, wherein the integrating means comprises a series-connected resistor and capacitor with said second signal voltage being formed across the capacitor.

WILLIAM R. AIKEN.

REFERENCES CITED

The following references are of record in the file of this patent:

UNITED STATES PATENTS

| Number | Name | Date |
|---|---|---|
| 2,190,504 | Schlesinger | Feb. 13, 1940 |
| 2,475,074 | Bradley et al. | July 5, 1949 |
| 2,484,612 | Dehn et al. | Oct. 11, 1949 |
| 2,501,368 | White | Mar. 21, 1950 |